United States Patent
Du

(10) Patent No.: US 9,867,756 B2
(45) Date of Patent: Jan. 16, 2018

(54) EYESIGHT-PROTECTION IMAGING SYSTEM AND EYESIGHT-PROTECTION IMAGING METHOD

(71) Applicant: Beijing Zhigu Rui Tuo Tech Co., Ltd, Beijing (CN)

(72) Inventor: Lin Du, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 14/781,581

(22) PCT Filed: Dec. 4, 2013

(86) PCT No.: PCT/CN2013/088553
§ 371 (c)(1),
(2) Date: Sep. 30, 2015

(87) PCT Pub. No.: WO2015/024328
PCT Pub. Date: Feb. 26, 2015

(65) Prior Publication Data
US 2016/0175181 A1    Jun. 23, 2016

(30) Foreign Application Priority Data
Aug. 22, 2013 (CN) .......................... 2013 1 0370314

(51) Int. Cl.
*G02C 1/00* (2006.01)
*A61H 5/00* (2006.01)
(Continued)

(52) U.S. Cl.
CPC ................. *A61H 5/00* (2013.01); *G02C 7/02* (2013.01); *G02C 7/081* (2013.01); *G02C 7/083* (2013.01); *G02C 11/10* (2013.01)

(58) Field of Classification Search
CPC .......... G02B 2027/0178; G02B 27/017; G02B 2027/0134; G02B 27/0179; G02C 7/027; G02C 7/025; G02C 5/20
(Continued)

(56) References Cited

U.S. PATENT DOCUMENTS

| 4,264,154 A | 4/1981 | Petersen |
| 4,572,616 A | 2/1986 | Kowel et al. |

(Continued)

FOREIGN PATENT DOCUMENTS

| CN | 1372650 | 10/2002 |
| CN | 1470227 A | 1/2004 |

(Continued)

OTHER PUBLICATIONS

International Search report dated Jun. 12, 2014 for PCT Application No. PCT/CN2013/088554, 4 pages.
(Continued)

*Primary Examiner* — Hung Dang
(74) *Attorney, Agent, or Firm* — Amin, Turocy & Watson, LLP

(57) ABSTRACT

This application discloses a vision protection imaging system and method. The system comprises: an adjustable lens module, configured to form an image of an object viewed by an eye; an imaging parameter adjustment module, configured to adjust an imaging parameter of the adjustable lens module according to a time pattern and an adjustment criterion; and a lens adjustment module, configured to adjust the adjustable lens module according to the imaging parameter. In the system and method of this application, an imaging parameter of the adjustable lens module is adjusted according to a time pattern and an adjustment criterion, so that an optical system of an eye is adjusted accordingly as well, thereby exercising the eye. Besides, the system and (Continued)

method have low costs, are easy to implement, and do not affect work, study, entertainment, or the like being currently performed by a user.

23 Claims, 4 Drawing Sheets

(51) Int. Cl.
  *G02C 7/02* (2006.01)
  *G02C 7/08* (2006.01)
  *G02C 11/00* (2006.01)

(58) Field of Classification Search
  USPC .......... 351/159, 205, 200, 206, 209, 41, 158
  See application file for complete search history.

(56) References Cited

U.S. PATENT DOCUMENTS

| | | |
|---|---|---|
| 5,182,585 A | 1/1993 | Stoner |
| 5,537,163 A | 7/1996 | Ueno |
| 6,072,443 A | 6/2000 | Nasserbakht et al. |
| 6,111,597 A | 8/2000 | Tabata |
| 6,151,061 A | 11/2000 | Tokuhashi |
| 6,152,563 A | 11/2000 | Hutchinson et al. |
| 6,325,513 B1 | 12/2001 | Bergner et al. |
| 7,001,020 B2 | 2/2006 | Yancey et al. |
| 7,298,414 B2 | 11/2007 | Stavely et al. |
| 7,334,892 B2 * | 2/2008 | Goodall .................. G02B 3/14 351/159.03 |
| 7,486,988 B2 | 2/2009 | Goodall et al. |
| 7,764,433 B2 | 7/2010 | Kam et al. |
| 7,766,479 B2 | 8/2010 | Ebisawa |
| 8,104,892 B2 | 1/2012 | Hillis et al. |
| 8,109,632 B2 | 2/2012 | Hillis et al. |
| 8,282,212 B2 | 10/2012 | Hillis et al. |
| 8,384,999 B1 | 2/2013 | Crosby et al. |
| 8,896,632 B2 | 11/2014 | MacDougall et al. |
| 2002/0101568 A1 | 8/2002 | Eberl et al. |
| 2002/0113943 A1 | 8/2002 | Trajkovic et al. |
| 2003/0043303 A1 | 3/2003 | Karuta et al. |
| 2003/0125638 A1 | 7/2003 | Husar et al. |
| 2005/0003043 A1 | 1/2005 | Sewal et al. |
| 2005/0014092 A1 | 1/2005 | Hasegawa et al. |
| 2006/0016459 A1 | 1/2006 | Mcfarlane et al. |
| 2006/0103808 A1 | 5/2006 | Horie |
| 2006/0122530 A1 | 6/2006 | Goodall et al. |
| 2006/0122531 A1 | 6/2006 | Goodall et al. |
| 2006/0146281 A1 | 7/2006 | Goodall et al. |
| 2007/0019157 A1 | 1/2007 | Hillis et al. |
| 2007/0211207 A1 | 9/2007 | Lo et al. |
| 2008/0002262 A1 | 1/2008 | Chirieleison |
| 2008/0106633 A1 | 5/2008 | Blum et al. |
| 2009/0066915 A1 | 3/2009 | Lai |
| 2009/0279046 A1 | 11/2009 | Dreher et al. |
| 2009/0303212 A1 | 12/2009 | Akutsu et al. |
| 2011/0018903 A1 | 1/2011 | Lapstun et al. |
| 2011/0019258 A1 | 1/2011 | Levola |
| 2011/0051087 A1 | 3/2011 | Inoue et al. |
| 2011/0213462 A1 | 9/2011 | Holladay |
| 2011/0242277 A1 | 10/2011 | Do et al. |
| 2011/0279277 A1 | 11/2011 | Li-Chung |
| 2012/0013389 A1 | 1/2012 | Thomas et al. |
| 2012/0092618 A1 | 4/2012 | Yoo et al. |
| 2012/0113235 A1 | 5/2012 | Shintani |
| 2012/0127422 A1 | 5/2012 | Tian et al. |
| 2012/0133891 A1 | 5/2012 | Jiang |
| 2012/0140044 A1 | 6/2012 | Galstian et al. |
| 2012/0154277 A1 | 6/2012 | Bar-Zeev et al. |
| 2012/0169730 A1 | 7/2012 | Inoue |
| 2012/0206485 A1 | 8/2012 | Osterhout et al. |
| 2012/0212499 A1 | 8/2012 | Haddick et al. |
| 2012/0212508 A1 | 8/2012 | Kimball |
| 2012/0242698 A1 | 9/2012 | Haddick et al. |
| 2012/0290401 A1 | 11/2012 | Neven |
| 2012/0307208 A1 | 12/2012 | Trousdale |
| 2013/0044042 A1 | 2/2013 | Olsson et al. |
| 2013/0050646 A1 | 2/2013 | Nanbara |
| 2013/0072828 A1 | 3/2013 | Sweis et al. |
| 2013/0107066 A1 | 5/2013 | Venkatraman et al. |
| 2013/0127980 A1 | 5/2013 | Haddick et al. |
| 2013/0135203 A1 | 5/2013 | Croughwell, III |
| 2013/0147836 A1 | 6/2013 | Small et al. |
| 2013/0241805 A1 | 9/2013 | Gomez |
| 2013/0241927 A1 | 9/2013 | Vardi |
| 2013/0278631 A1 | 10/2013 | Border et al. |
| 2013/0335301 A1 | 12/2013 | Wong et al. |
| 2013/0335404 A1 | 12/2013 | Westerinen et al. |
| 2013/0342572 A1 | 12/2013 | Poulos et al. |
| 2014/0078175 A1 | 3/2014 | Forutanpour et al. |
| 2014/0160157 A1 | 6/2014 | Poulos et al. |
| 2014/0225915 A1 | 8/2014 | Theimer et al. |
| 2014/0225918 A1 | 8/2014 | Mittal et al. |
| 2014/0232746 A1 | 8/2014 | Ro et al. |
| 2014/0240351 A1 | 8/2014 | Scavezze et al. |
| 2014/0267400 A1 | 9/2014 | Mabbutt et al. |
| 2014/0267420 A1 | 9/2014 | Schowengerdt et al. |
| 2014/0282224 A1 | 9/2014 | Pedley |
| 2014/0375680 A1 | 12/2014 | Ackerman et al. |
| 2015/0002542 A1 | 1/2015 | Chan et al. |
| 2015/0035861 A1 | 2/2015 | Salter et al. |
| 2015/0070391 A1 | 3/2015 | Nishimaki et al. |
| 2015/0234184 A1 | 8/2015 | Schowengerdt et al. |
| 2015/0235632 A1 | 8/2015 | Liu et al. |
| 2016/0035139 A1 | 2/2016 | Fuchs et al. |
| 2016/0171772 A1 | 6/2016 | Ryznar et al. |
| 2016/0189432 A1 | 6/2016 | Bar-Zeev et al. |
| 2016/0196603 A1 | 7/2016 | Perez et al. |

FOREIGN PATENT DOCUMENTS

| | | |
|---|---|---|
| CN | 1141602 | 3/2004 |
| CN | 1527126 | 9/2004 |
| CN | 1604014 | 4/2005 |
| CN | 1645244 | 7/2005 |
| CN | 1653374 A | 8/2005 |
| CN | 1901833 | 1/2007 |
| CN | 1912672 | 2/2007 |
| CN | 2868183 | 2/2007 |
| CN | 1951314 | 4/2007 |
| CN | 101069106 | 11/2007 |
| CN | 101072534 | 11/2007 |
| CN | 101097293 A | 1/2008 |
| CN | 101103902 | 1/2008 |
| CN | 201005945 Y | 1/2008 |
| CN | 101116609 | 2/2008 |
| CN | 101155258 | 4/2008 |
| CN | 101194198 | 6/2008 |
| CN | 101430429 A | 5/2009 |
| CN | 201360319 | 9/2009 |
| CN | 201352278 | 11/2009 |
| CN | 101900927 | 1/2010 |
| CN | 101662696 | 3/2010 |
| CN | 201464738 U | 5/2010 |
| CN | 101782685 | 7/2010 |
| CN | 101819331 A | 9/2010 |
| CN | 101819334 | 9/2010 |
| CN | 201637953 | 11/2010 |
| CN | 101917638 | 12/2010 |
| CN | 201754203 | 3/2011 |
| CN | 102008288 | 4/2011 |
| CN | 102083390 | 6/2011 |
| CN | 102203850 | 9/2011 |
| CN | 102292017 | 12/2011 |
| CN | 102419631 | 4/2012 |
| CN | 102481097 | 5/2012 |
| CN | 101149254 | 6/2012 |
| CN | 102487393 | 6/2012 |
| CN | 202267785 | 6/2012 |
| CN | 102572483 | 7/2012 |
| CN | 102576154 | 7/2012 |
| CN | 202383380 | 8/2012 |
| CN | 102918444 | 2/2013 |
| CN | 102939557 | 2/2013 |

(56) References Cited

FOREIGN PATENT DOCUMENTS

| | | |
|---|---|---|
| CN | 102981270 | 3/2013 |
| CN | 103054695 A | 4/2013 |
| CN | 103065605 | 4/2013 |
| CN | 103150013 | 6/2013 |
| CN | 103190883 | 7/2013 |
| CN | 103197757 | 7/2013 |
| CN | 103280175 | 9/2013 |
| CN | 103297735 | 9/2013 |
| CN | 103353663 | 10/2013 |
| CN | 103353667 | 10/2013 |
| CN | 103353677 | 10/2013 |
| CN | 103558909 | 2/2014 |
| DE | 19959379 A1 | 7/2000 |
| EP | 2646859 | 10/2013 |
| JP | 03023431 | 1/1991 |
| JP | 2676870 | 11/1997 |
| JP | H09289973 | 11/1997 |
| JP | 3383228 | 3/2003 |
| JP | 2003307466 | 10/2003 |
| JP | 2005058399 | 3/2005 |
| JP | 2007129587 | 5/2007 |
| JP | 201143876 | 3/2011 |
| JP | 2012199621 | 10/2012 |
| JP | 2012247449 | 12/2012 |
| TW | 201012448 A | 4/2010 |
| WO | 2004/023167 A2 | 3/2004 |
| WO | 2005077258 | 8/2005 |
| WO | 2012075218 | 6/2012 |
| WO | 2012083415 | 6/2012 |
| WO | 2013074851 | 5/2013 |

OTHER PUBLICATIONS

International Search Report dated Jan. 8, 2015 for PCT Application No. PCT/CN2014/088242, 2 pages.
International Search Report dated May 5, 2014 for PCT Application No. PCT/CN2013/088544, 4 pages.
International Search Report dated Jun. 5, 2014 for PCT Application No. PCT/CN2013/088549, 4 pages.
Smith, et al., "Determining Driver Visual Attention With One Camera", IEEE Transactions on Intelligent Transportation Systems, vol. 4, No. 4, Dec. 2003, 14 Pages.
Singh, et al., "Human Eye Tracking and Related Issues: A Review", International Journal of Scientific and Research Publications, vol. 2, Issue 9, Sep. 2012, ISSN 2250-3153, 9 pages.
Ji et al., "Real-Time Eye, Gaze and Face Pose Tracking for Monitoring Driver Vigilance", Real-Time Imaging 8, 357-377 (2002) available online at http://www.idealibrary.com, 21 pages.
Office Action dated Dec. 29, 2016 for U.S. Appl. No. 14/780,519, 25 pages.
Office Action dated Feb. 27, 2017 for U.S. Appl. No. 14/783,495, 39 pages.
Office Action dated Mar. 30, 2017 for U.S. Appl. No. 15/028,019, 36 pages.
Office Action dated Apr. 20, 2017 for U.S. Appl. No. 14/781,578, 77 pages.
Office Action dated May 3, 2017 for U.S. Appl. No. 14/781,306, 46 pages.
International Search Report dated Mar. 6, 2014 for PCT Application No. PCT/CN2013/088540, 8 pages.
Jeong, et al. "Tunable microdoublet lens array", Optics Express, vol. 12, Issue 11, May 2004, pp. 2494-2500.
International Search Report dated Apr. 3, 2014 for PCT Application No. PCT/CN2013/088531, 10 pages.
International Search Report dated Feb. 27, 2014 for PCT Application No. PCT/CN2013/088522, 6 pages.
International Search Report dated May 8, 2014 for PCT Application No. PCT/CN2013/088547, 4 pages.
Kim et al., "A 200 s Processing Time Smart Image Sensor for an Eye Tracker using pixel-level analog image processing", IEEE Journal of Solid-State Circuits, vol. 44, No. 9, Sep. 2009, 10 pages.
Hansen et al., "In the eye of the beholder: a survey of models for eyes and gaze", IEEE Transactions on pattern analysis and machine intelligence, vol. 32, No. 3, Mar. 2010, 23 pages.
International Search Report dated May 28, 2014 for PCT Application No. PCT/CN2013/088553, 6 pages.
Office Action dated Jun. 29, 2017 for U.S. Appl. No. 14/783,495, 50 pages.
Office Action dated Jun. 29, 2017 for U.S. Appl. No. 14/783,503, 120 pages.
Gao et al. "Measuring Directionality of the Retinal Reflection with a Shack-Hartmann Wavefront Sensor", Dec. 2009, Optics Express, vol. 17, No. 25, Optical Society of America, 20 pages.
Office Action dated Jul. 12, 2017 for U.S. Appl. No. 14/780,519, 45 pages.
Office Action dated Jun. 8, 2017 for U.S. Appl. No. 14/779, 968, 79 pages.
Office Action dated Oct. 4, 2017 for U.S. Appl. No. 14/781,584, 95 pages.

\* cited by examiner

US 9,867,756 B2

EYESIGHT-PROTECTION IMAGING SYSTEM AND EYESIGHT-PROTECTION IMAGING METHOD

RELATED APPLICATION

This application is a U.S. National Stage filing under 35 U.S.C. § 371 of international patent cooperation treaty (PCT) application No. PCT/CN2013/088553, filed Dec. 4, 2013, and entitled "EYESIGHT-PROTECTION IMAGING SYSTEM AND EYESIGHT-PROTECTION IMAGING METHOD," which claims priority to Chinese Patent Application No. 201310370314.6, filed with the Chinese Patent Office on Aug. 22, 2013 and entitled "VISION PROTECTION IMAGING SYSTEM AND METHOD", which applications are hereby incorporated herein by reference in their respective entireties.

TECHNICAL FIELD

This application relates to the field of imaging technologies, and in particular, to a vision protection imaging system and method.

BACKGROUND

A crystalline lens of an eye is shaped like a biconvex lens and is very elastic. When a ciliary muscle contracts, a suspensory ligament relaxes, and the crystalline lens bulges using its own elasticity, to shorten a focal distance and change a diopter; therefore, the eye can clearly view an object at a near distance. When the eye views an object at a far distance, the ciliary muscle relaxes, and the crystalline lens is in a flat state at this time. If the eye views an object at a near distance for a long time, a ciliary body is in a contracted and strained state for a long time and cannot get enough rest. As a result, the eye may feel fatigue, sore, or painful, or a qualitative change that is difficult to recover may even occur in the crystalline lens, causing refractive errors such as nearsightedness. However, during daily usage of eyes, people spend a lot of time viewing objects at a near distance, for example, reading a book, writing, or viewing various screens (such as screens of a television, a computer, a tablet computer, and a mobile phone), and usually forget to or do not have time to frequently look into the distance and protect vision by letting the ciliary muscle relax for a while.

In prior arts, for example, Taiwan Patent Publication No. TW201012448A, various methods for helping people protect vision are recorded. For example, a panel capable of sliding forward and backward is used, so that people continually adjust focal distances of crystalline lenses of eyes when gazing at the panel, thereby achieving the objective of exercising the eyes. For another example, a fatigue degree of eyes is monitored, and when it is found that the eyes are fatigue, an alarm signal is automatically sent, requesting a user to exercise eyes. All these technologies require interruption of an action such as work or study being currently performed by a user to dedicatedly exercise eyes, and require dedicated eye exercise devices. Some of the devices are difficult to carry and have bad user experience. Therefore, an apparatus and a method which can protect vision of eyes without affecting a business being currently dealt with by a user need be found.

SUMMARY

An example objective of this application is to provide a vision protection imaging system and method, which have low costs and are easy to implement, so as to protect vision of a user without significantly affecting the normal life of the user.

To achieve the foregoing objective, according to a first example embodiment, this application provides a vision protection imaging system, comprising:

an adjustable lens module, configured to form an image of an object viewed by an eye;

an imaging parameter adjustment module, configured to adjust at least one imaging parameter of the adjustable lens module according to a time pattern and an adjustment criterion; and a lens adjustment module, configured to adjust the adjustable lens module according to the imaging parameter.

According to a second example embodiment, this application provides a vision protection imaging method, comprising:

adjusting at least one imaging parameter of an adjustable lens module according to a time pattern and an adjustment criterion, where the adjustable lens module is configured to form an image of an object viewed by an eye; and adjusting the adjustable lens module according to the imaging parameter.

In the foregoing technical solutions of the implementation manners of this application, an imaging parameter of the adjustable lens module is adjusted according to a time pattern and an adjustment criterion, so that an optical system of an eye is adjusted accordingly as well, thereby exercising the eye. Besides, the implementation manners of this application have low costs, are easy to implement, and do not affect work, study, entertainment, or the like being currently performed by a user.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

A method and system in this application are described in detail as follows with reference to the accompanying drawings and embodiments.

Figure 1:
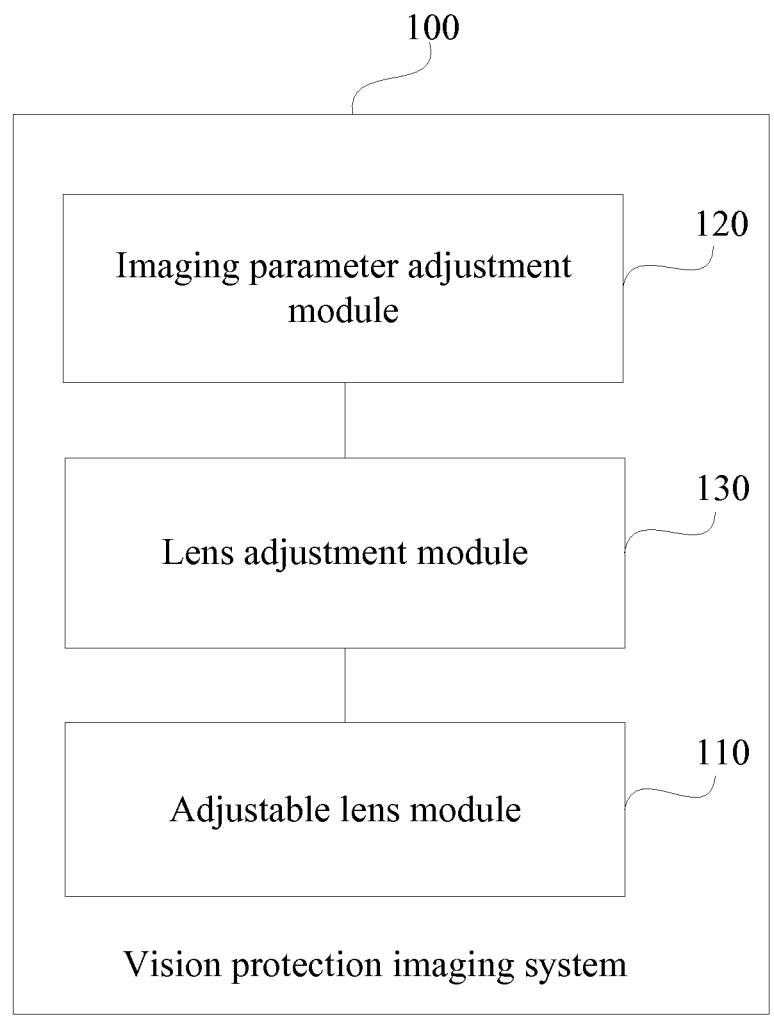
FIG. 1 is a schematic structural block diagram of a vision protection imaging system according to an embodiment of this application.

Some sight problems are caused by improper use of eyes, for example, using eyes to view objects at a near distance for a long time causes refractive errors such as nearsightedness. In order to help a user frequently exercise eye muscles (such as a ciliary muscle and a rectus) so as to prevent eyes from being in a strained adjustment state for a long time, as shown in FIG. 1, an embodiment of this application provides a vision protection imaging system 100, comprising:

an adjustable lens module 110, of which an imaging parameter is adjustable, configured to form an image of an object viewed by an eye;

an imaging parameter adjustment module 120, configured to adjust the imaging parameter of the adjustable lens module according to a time pattern and an adjustment criterion; and a lens adjustment module 130, configured to adjust the adjustable lens module according to the imaging parameter.

In the embodiment of this application, an image of an object is formed on a retina through the adjustable lens module 110 and an optical system (comprising a crystalline lens) of an eye. In the embodiment of this application, an imaging parameter of the adjustable lens module is adjusted according to a time pattern and an adjustment criterion. In order to keep the image of the object obtained on the retina unchanged or basically unchanged, a brain controls the optical system of the eye to be adjusted accordingly as well, thereby exercising the eye. That is, the embodiment of this application can reduce, with low costs and in a manner that is easy to implement, a probability of occurrence or deterioration of sight problems such as nearsightedness due to improper use of eyes, and do not affect work, study, entertainment, or the like being currently performed by a user.

Figure 2:
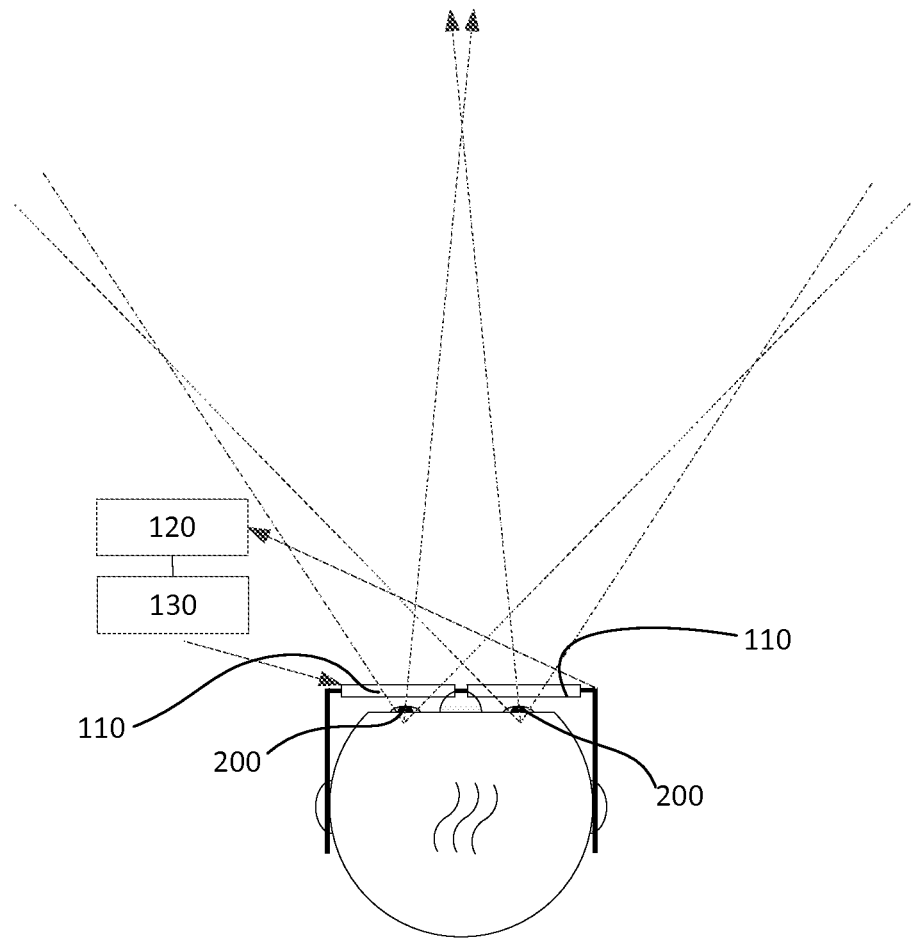
FIG. 2 is a schematic structural diagram of an application of a vision protection imaging system according to an embodiment of this application.

As shown in FIG. 2, in a possible implementation manner of the embodiment of this application, the vision protection imaging system may be an apparatus that is easy to carry and convenient to use, for example, glasses (comprising frame glasses, contact lenses, goggles, or the like). Especially for a user who has a sight problem such as an refractive error and therefore needs to wear refractive correction glasses, the system in this application can be directly implemented on the refractive correction glasses, so as to correct vision of the user and reduce a deterioration probability or a deterioration degree of the sight problem of the user at the same time or even mitigate the sight problem such as the refractive error of the user. In this case, the user does not need an additional device to protect an eye 200, and therefore no extra burden is brought to the work, life, or the like of the user.

Certainly, in other possible implementation manners of the embodiment of this application, the vision protection imaging system may also be, for example, another optical device used in cooperation with eyes of a user, such as a helmet eye shield, a front windshield of a cab, or a microscope.

Preferably, in some possible implementation manners of the embodiment of this application, the adjustable lens module 110 may comprise an electronic adjustable lens, such as a liquid or liquid crystal lens disclosed in U.S. Patent Publication No. US20070211207A1 and U.S. Patent Publication No. U.S. Pat. No. 4,572,616A. By controlling a liquid or a liquid crystal in the lens, an imaging parameter such as a shape or a refractive index of the lens is changed quickly. In a case in which the system in this application is applied to a portable and wearable device such as glasses, using a single electronic adjustable lens as the adjustable lens module 110 can make the system smaller, lighter, and more convenient to carry, and the manner of applying the electronic adjustable lens to glasses already has business applications, for example, electronic focusing glasses Empower launched by the Pixeloptics company, which can quickly adjust a focal distance of a lens.

Besides the foregoing electronic adjustable lens, a lens group comprising multiple lenses may also be used to form the adjustable lens module 110. For example, the parameter of the adjustable lens module 110 is adjusted by changing positions of the multiple lenses and optical axis angles of the lenses and by eccentrically arranging the optical axis of the multiple lenses, where a part or all of the multiple lenses are adjustable lenses.

In a possible implementation manner of the embodiment of this application, preferably, the adjustable imaging parameter of the adjustable lens module 110 is mainly an imaging parameter related to exercising of eyes, for example, a focal distance of the adjustable lens module 110. When the focal distance of the adjustable lens module 110 is changed, in order to ensure that a clear image of the object is formed on the retina, a focal distance of the optical system of the eye also necessarily needs to be changed accordingly; for example, a ciliary muscle moves to cause a change of a shape of the crystalline lens, thereby exercising the eye and protecting vision.

Besides the focal distance of the adjustable lens module 110, in a possible implementation manner of the embodiment of this application, preferably, the adjustable imaging parameter of the adjustable lens module 110 may also comprise an optical axis direction of the adjustable lens module 110. By adjusting the optical axis direction of the adjustable lens module 110, eye muscles related to rolling of an eyeball, such as an eye rectus and an eye oblique muscle, can be exercised, thereby achieving the objective of vision protection.

Only the focal distance or the optical axis direction of the adjustable lens module 110 is adjustable, or both the focal distance and the optical axis direction are adjustable; and in other possible implementation manners of the embodiment of this application, besides the focal distance and the optical axis direction, in order to better exercise the eye and/or in order to form a better image of the object based on adjustment of other parameters, other imaging parameters of the adjustable lens module 110 may also be adjustable, and are not listed one by one herein.

Preferably, in a possible implementation manner of the embodiment of this application, the imaging parameter adjustment module regularly adjusts the imaging parameter according to a period. That is, the "time pattern" is time set according to a period. In some possible implementation manners, the period may be fixed; for example, the period is set to one hour, and the imaging parameter of the system is adjusted once every hour, and a user also exercises eyes once every hour; or in some other possible implementation manners, the period may be a period that is changed according to a pattern; for example, adjustment is performed once at long intervals at the beginning, but with the increase of usage time of eyes, adjustment frequency is also increased; or the period is changed according to a change of another parameter.

The period may be set after the system is completed and remain unchanged afterwards, or may be changed during use. Therefore, in some possible implementation manners of the embodiment of this application, the imaging parameter adjustment module 120 comprises:

a period setting unit 121, configured to automatically or manually set the period.

A user may manually set the period as required. For example, when currently in the open air or other places where a user uses eyes in a relaxed way, the user may manually set the period to a long period, so as to reduce adjustment frequency; or when about to sleep for a rest, the user may even manually disable an adjustment function, that is, manually control the period to be not adjusted during the entire sleep. Besides, the system may also automatically adjust the period according to information about a user or environment information, which is further mentioned in the following.

In order to affect use by a user as little as possible and exercise eyes of the user as well as possible, the imaging parameter adjustment module adjusts the imaging parameter of the adjustable lens module according to a preset adjustment criterion.

Preferably, in a possible implementation manner of the embodiment of this application, the adjustment criterion comprises:
repeatedly changing the imaging parameter of the adjustable lens module within a set adjustment range.

The set adjustment range may be set according to vision of a user (which may be average vision of ordinary users or may be specific vision of a current user), and it would be best that within the adjustment range, the user can still clearly or relatively clearly view the object by self-adjustment and by using the adjustable lens module. Most preferably, within the adjustment range, the user does not even notice that an imaging parameter of the optical system of the eye is being adjusted. Alternatively, in other possible implementation manners of the embodiment of this application, the vision of the user may not be considered, to directly let the user notice that the adjustable lens module is being adjusted and thereby exercise the eye in cooperation with the adjustment.

For example, the current imaging parameter of the adjustable lens module is used as a benchmark; a diopter of the adjustable lens module is first increased gradually and then decreased gradually to the benchmark; or the diopter may be decreased to a value less than the benchmark and then increased to the benchmark. Alternatively, the foregoing process may be further performed repeatedly, and extreme values to which the diopter is increased and decreased do not exceed the foregoing adjustment range.

In a possible implementation manner of the embodiment of this application, the adjustment criterion comprises:
adding a time-related additional value to a value of the imaging parameter of the adjustable lens module. In this implementation manner, preferably, the additional value is within an additional value range which is set.

For example, an additional value Delta is added to a current value of the focal distance, where Delta is a function of time t and is changed within a range of [−Min, +Max], that is, Delta=f(t), Delta ∈[−Min, +Max]. By using the adjustment method in this implementation manner, the imaging parameter of the adjustable lens module can be adjusted continuously rather than changed abruptly, so that the user does not feel dizzy or have other uncomfortable feelings because of the adjustment.

Besides the foregoing adjustment method, in this application, the adjustment criterion of this application may also be formulated according to eye exercise methods for vision protection (for example, the Bates therapy) in ophthalmology researches.

Figure 3:
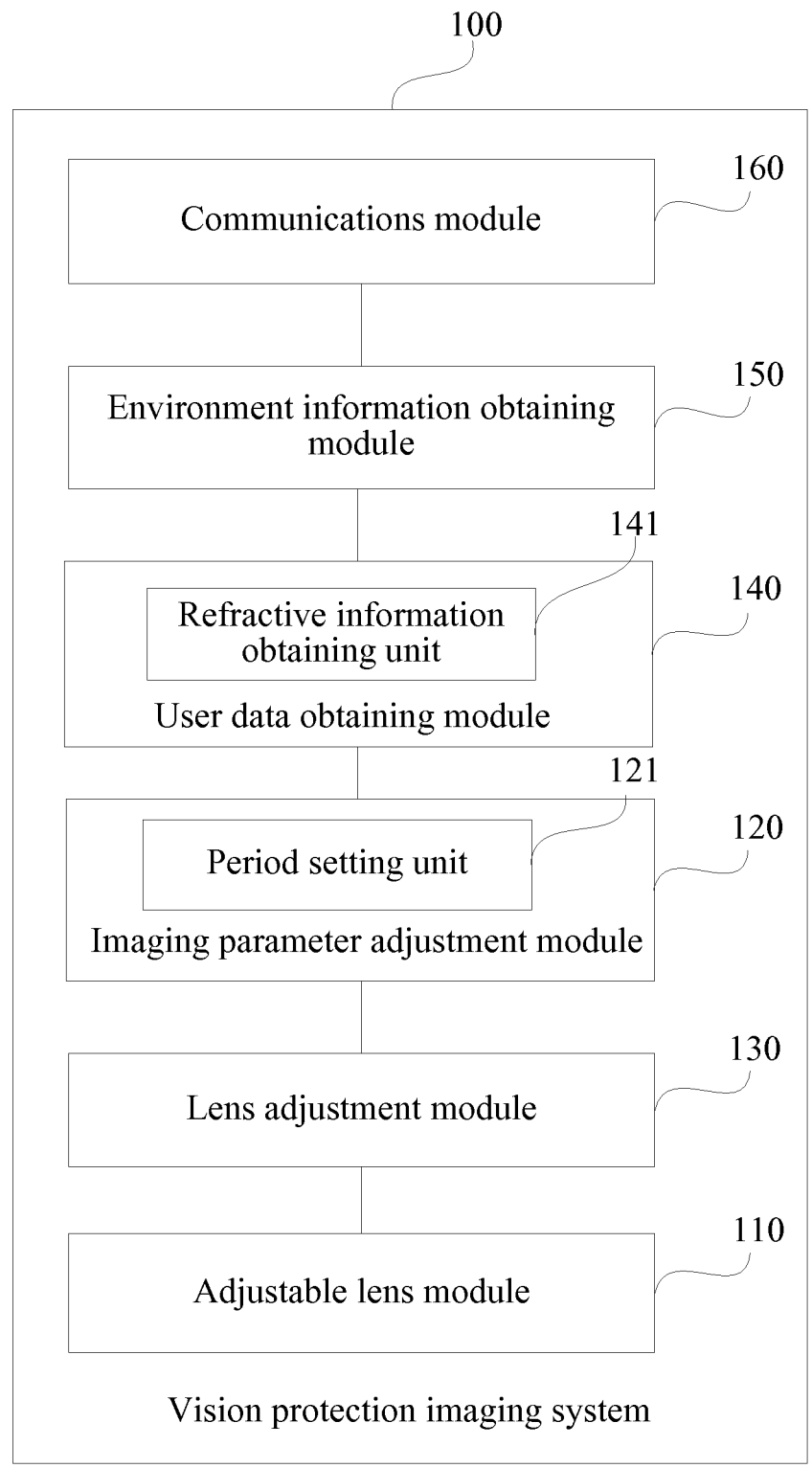
FIG. 3 is a schematic structural block diagram of another vision protection imaging system according to an embodiment of this application.

As shown in FIG. 3, preferably, in a possible implementation manner of the embodiment of this application, the system comprises:
a user data obtaining module 140, configured to obtain data about a user.

The data about the user preferably comprises data related to vision and exercising of eyes of the user, such as the vision, age, and occupation of the user. The data may be manually input by the user and obtained, and/or may be automatically obtained by means of collection or transmission.

In this implementation manner, the imaging parameter adjustment module forms the time pattern and/or the adjustment criterion according to the data about the user.

In this way, a more suitable adjustment criterion can be formed for the user according to the data about the user, so that the system achieves a better effect in terms of helping the user with eye exercises and vision protection.

Preferably, in a possible implementation manner of the embodiment of this application, the user data obtaining module 140 may comprise a refractive information obtaining unit 141, configured to study an imaging parameter, which is corresponding to the eye when the eye separately obtains expected images of an object at multiple distances, to obtain refractive correction information corresponding to the eye. The expected image may be, for example, a clear image or a relatively clear image of the object. The imaging parameter adjustment module adjusts the imaging parameter of the adjustable lens module according to the refractive correction information, so as not to affect the work, life, and the like of the user.

Preferably, in a possible implementation manner of the embodiment of this application, the system comprises:
an environment information obtaining module 150, configured to obtain environment information. In this implementation manner, the environment information may comprise brightness information, time information (working time during the day, rest time at night, or the like), scene information (indoor or outdoor, at a far distance or at a near distance, or the like), or other types of environment information related to use of eyes, which are not listed one by one herein.

In this embodiment, the imaging parameter adjustment module forms the time pattern and/or the adjustment criterion according to the environment information.

For example, according to brightness information and/or time information, it is learned that the user is currently sleeping; therefore, at this time, a corresponding adjustment criterion may be, for example, that during this period of time, the adjustable lens module is not adjusted, so as to reduce energy consumption and prolong service life of the system. For another example, according to scene information or the like, it is learned that the user is currently using eyes to view an object at a near distance and has used the eyes continuously for a long time, adjustment frequency may be increased, so that the eyes of the user get more exercises.

Preferably, in a possible implementation manner of the embodiment of this application, the system comprises:
a communications module 160, configured to perform communication between the system and the outside.

One or more of the foregoing data about a user, environment information, and setting of the adjustment criterion and the adjustment period may be obtained by means of the communication between the communications module 160 and the outside. Herein, the communications module is preferably a wireless communications module. Certainly, a wired communications module may also be applied to the embodiment of this application.

By using the foregoing system, a user adjusts an optical system of an eye and corresponding muscles regularly and according to a rule, which can effectively protect vision.

Figure 4:
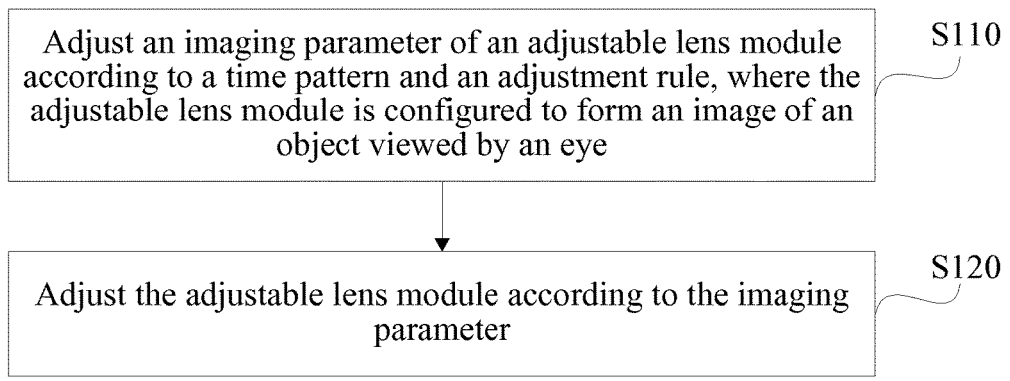
FIG. 4 is a schematic structural block diagram of an imaging parameter adjustment module of a vision protection imaging system according to an embodiment of this application.

As shown in FIG. 4, a possible implementation manner of an embodiment of this application further provides a vision protection imaging method, comprising:
S110: Adjust an imaging parameter of an adjustable lens module according to a time pattern and an adjustment criterion, where the adjustable lens module is configured to form an image of an object viewed by an eye.

S120: Adjust the adjustable lens module according to the imaging parameter.

In the embodiment of this application, an imaging parameter of the adjustable lens module is adjusted according to a time pattern and an adjustment criterion. In order to keep an image of an object obtained on a retina unchanged or basically unchanged, a brain controls an optical system of an eye to be adjusted accordingly as well, thereby exercising the eye. That is, the embodiment of this application can reduce, with low costs and in a manner that is easy to implement, a probability of occurrence or deterioration of sight problems such as nearsightedness due to improper use of eyes, and do not affect work, study, entertainment, or the like being currently performed by a user.

In a possible implementation manner of the embodiment of this application, preferably, the adjustable imaging parameter of the adjustable lens module is mainly an imaging parameter related to exercising of eyes, for example, a focal distance of the adjustable lens module. When the focal distance of the adjustable lens module is changed, in order to ensure that a clear image of the object is formed on a retina, a focal distance of an optical system of the eye also necessarily needs to be changed accordingly, for example, a ciliary muscle moves to cause a change of a shape of a crystalline lens, thereby exercising the eye and protecting vision.

Besides the focal distance of the adjustable lens module, in a possible implementation manner of the embodiment of this application, preferably, the adjustable imaging parameter of the adjustable lens module may also comprise an optical axis direction of the adjustable lens module. By adjusting the optical axis direction of the adjustable lens module, eye muscles related to rolling of an eyeball, such as an eye rectus and an eye oblique muscle, can be exercised, thereby achieving the objective of vision protection.

Only the focal distance or the optical axis direction of the adjustable lens module is adjustable, or both the focal distance and the optical axis direction are adjustable; and in other possible implementation manners of the embodiment of this application, besides the focal distance and the optical axis direction, in order to better exercise the eye and/or in order to form a better image of the object based on adjustment of other parameters, other imaging parameters of the adjustable lens module may also be adjustable, and are not listed one by one herein.

Preferably, in a possible implementation manner of the embodiment of this application, the step S110, that is, the step of adjusting an imaging parameter of an adjustable lens module according to a time pattern and an adjustment criterion comprises:

regularly adjusting the imaging parameter of the adjustable lens module according to a period.

That is, the "time pattern" is time set according to a period. In some possible implementation manners, the period may be fixed; for example, the period is set to one hour, and the imaging parameter of the system is adjusted once every hour, and a user also exercises eyes once every hour; or in some other possible implementation manners, the period may be a period that is changed according to a pattern; for example, adjustment is performed once at long intervals at the beginning, but with the increase of usage time of eyes, adjustment frequency is also increased; or the period is changed according to a change of another parameter.

Preferably, in a possible implementation manner of the embodiment of this application, the method further comprises automatically or manually setting the period. A user may manually set the period as required. For example, when currently in the open air or other places where a user uses eyes in a relaxed way, the user may manually set the period to a long period, so as to reduce adjustment frequency; or when about to sleep for a rest, the user may even manually disable an adjustment function, that is, manually control the period to be not adjusted during the entire sleep.

Preferably, in a possible implementation manner of the embodiment of this application, the adjustment criterion comprises:

repeatedly changing the imaging parameter of the adjustable lens module within a set adjustment range.

Preferably, in a possible implementation manner of the embodiment of this application, the adjustment criterion comprises:

adding a time-related additional value to a value of the imaging parameter of the adjustable lens module.

By using the adjustment criterion in this implementation manner, use by the user is affected as little as possible and the user can exercise eyes as well as possible. A specific implementation manner is similar to the manner described in the above system embodiment, and is not described herein again.

Preferably, in a possible implementation manner of the embodiment of this application, the method comprises: obtaining data about a user.

Preferably, in a possible implementation manner of the embodiment of this application, the method comprises: forming the time pattern and/or the adjustment criterion according to the data about the user.

Preferably, in a possible implementation manner of the embodiment of this application, the method comprises: obtaining environment information.

Preferably, in a possible implementation manner of the embodiment of this application, the method comprises: forming the time pattern and/or the adjustment criterion according to the environment information.

By using this implementation manner to form the time pattern and/or the adjustment criterion, an adjustment solution more suitable for the user can be formed for the user, so that the embodiment of this application achieves a better effect in terms of helping the user with eye exercises and vision protection. A specific implementation manner is similar to the manner described in the above system embodiment, and is not described herein again.

A person skilled in the art may understand that in the foregoing method in the specific implementation manners of this application, the serial numbers of the steps do not indicate an execution sequential order; a sequential order in which the steps are executed should be determined according to functions and internal logic of the steps, and the serial numbers should not constitute any limitation to an implementation process of the specific implementation manners of this application.

Figure 5:
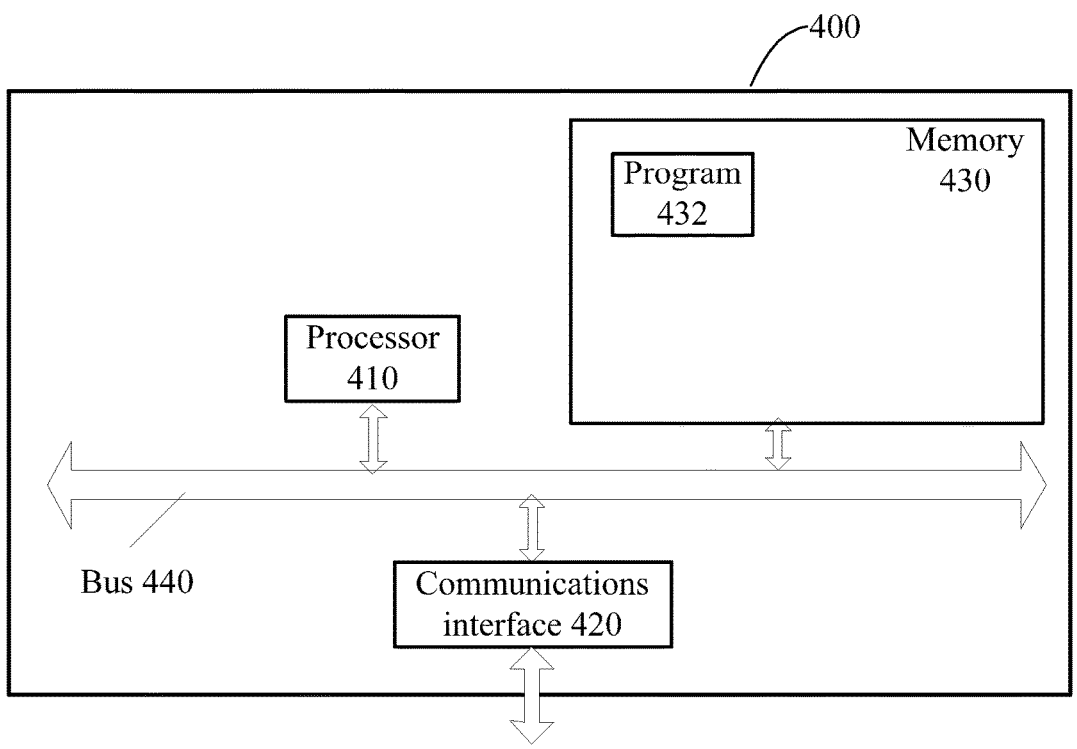
FIG. 5 is a schematic flowchart of a vision protection imaging method according to an embodiment of this application.

FIG. 5 is a schematic structural diagram of an imaging parameter adjustment module 400 according to a possible implementation manner of an embodiment of this application. The specific embodiment of this application is not a limitation to specific implementation of the imaging parameter adjustment module 400. As shown in FIG. 5, the imaging parameter adjustment module 400 may comprise: a processor 410, a communications interface 420, a memory 430, and a communications bus 440, where the processor 410, the communications interface 420, and the memory 430 communicate with each other through the communications bus 440.

The communications interface 420 is configured to communicate with a network element such as a client.

The processor 410 is configured to execute a program 432, and may specifically execute a related step in the foregoing method embodiment shown in FIG. 4.

Specifically, the program 432 may comprise program code, where the program code comprises a computer operating instruction.

The processor 410 may be a central processing unit (CPU), an application specific integrated circuit (ASIC), or one or more integrated circuits configured to implement the embodiment of this application.

The memory 430 is configured to store the program 432. The memory 430 may comprise a high-speed RAM memory, or may further comprise a non-volatile memory, for example, at least one disk memory. The program 432 may specifically enable the imaging parameter adjustment module 400 to execute the following step:

adjusting an imaging parameter of an adjustable lens module according to a time pattern and an adjustment criterion.

For specific implementation of the step of the program 432, reference may be made to the description of a corresponding step and unit in the foregoing embodiments of this application, which are not described herein again. A person skilled in the art may clearly understand that for the purpose of convenient and brief description, for a specific working process of the foregoing device and modules, reference may be made to the description of a corresponding process in the foregoing method embodiment, which is not described herein again.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but such implementation should not be considered beyond the scope of this application.

When implemented in a form of a software functional unit and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium and comprises several instructions for instructing a computer device (which may be a personal computer, a server, a network device, or the like) to perform all or a part of the steps of the methods described in the embodiments of this application. The foregoing storage medium comprises: any mediums capable of storing program code, such as a USB flash drive, a removable hard disk, a read-only memory (ROM), a random access memory (RAM), a magnetic disk, or an optical disc.

The foregoing implementation manners are merely intended for describing this application rather than limiting this application. A person of ordinary skill in the art may make various variations or modifications without departing from the spirit and scope of this application. Therefore, all equivalent technical solutions also fall within the scope of this application, and the patent protection scope of this application shall be limited by the claims.

What is claimed is:

1. A system, comprising:
   an adjustable lens module configured to form an image of an object determined to be viewed by an eye;
   an imaging parameter adjustment module configured to periodically adjust at least one imaging parameter of the adjustable lens module according to a preset time period and an adjustment criterion, wherein the adjustment criterion comprises: periodically changing the at least one imaging parameter of the adjustable lens module within a set adjustment range; and
   a lens adjustment module configured to adjust the adjustable lens module according to the at least one imaging parameter.

2. The system of claim 1, wherein the at least one imaging parameter of the adjustable lens module comprises a focal distance of the adjustable lens module.

3. The system of claim 1, wherein the at least one imaging parameter of the adjustable lens module comprises an optical axis direction of the adjustable lens module.

4. The system of claim 1, wherein the imaging parameter adjustment module comprises:
   a period setting unit enabling setting of the preset time period.

5. The system of claim 1, further comprising:
   a user data obtaining module configured to obtain data about a user of the system based on a user identity determined by the system.

6. The system of claim 5, wherein the imaging parameter adjustment module is further configured to determine the time pattern and/or the adjustment criterion according to the data about the user.

7. The system of claim 5, further comprising:
   a communications module configured to communicate with an external device external to the system.

8. The system of claim 1, further comprising:
   an environment information obtaining module configured to obtain at least a piece of environment information.

9. The system of claim 8, wherein the imaging parameter adjustment module is further configured to determine the time pattern and/or the adjustment criterion according to at least the piece of the environment information.

10. The system of claim 1, wherein the system is a pair of glasses.

11. A method, comprising:
    periodically adjusting, by a system comprising a processor, at least one imaging parameter of an adjustable lens module according to a preset time period and an adjustment criterion, wherein the adjustment criterion comprises: periodically changing the at least one imaging parameter of the adjustable lens module within a set adjustment range, and wherein the adjustable lens module is configured to form an image of an object determined to be viewed by an eye; and
    adjusting the adjustable lens module according to the at least one imaging parameter.

12. The method of claim 11, wherein the at least one imaging parameter of the adjustable lens module comprises a focal distance of the adjustable lens module.

13. The method of claim 11, wherein the at least one imaging parameter of the adjustable lens module comprises an optical axis direction of the adjustable lens module.

14. The method of claim 11, comprising rendering output from the system that enables an input to change the preset period to another period.

15. The method of claim 11, wherein the adjustment criterion comprises:
adding a time-related additional value to a value of the at least one imaging parameter of the adjustable lens module.

16. The method of claim 11, further comprising:
obtaining data about a user of the system.

17. The method of claim 16, further comprising:
determining the time pattern and/or the adjustment criterion according to the data about the user.

18. The method of claim 11, further comprising:
obtaining environment information relating to an environment of the system.

19. The method of claim 18, further comprising:
determining the time pattern and/or the adjustment criterion according to the environment information.

20. A computer readable storage device comprising executable instructions that, in response to execution, cause a system comprising a processor to perform operations, comprising:
periodically adjusting an imaging parameter of an adjustable lens module according to a preset time period and a defined criterion, wherein the defined criterion comprises periodically changing the imaging parameter of the adjustable lens module within a set adjustment range, and wherein the adjustable lens module is configured to image an object determined to be viewed from a reference point comprising an eye; and
adjusting the adjustable lens module according to the imaging parameter.

21. The computer readable storage device of claim 20, wherein the imaging parameter of the adjustable lens module comprises a focal distance of the adjustable lens module.

22. The computer readable storage device of claim 20, wherein the imaging parameter of the adjustable lens module comprises an optical axis direction of the adjustable lens module.

23. The computer readable storage device of claim 20, the operations further comprising rendering output that enables an input to change the preset period to another period.

* * * * *